(12) United States Patent
Killguss et al.

(10) Patent No.: US 9,470,892 B2
(45) Date of Patent: Oct. 18, 2016

(54) HEAD-UP DISPLAY FOR A VEHICLE

(75) Inventors: Werner Killguss, Neuweiler (DE);
Sebastien Hervy, Liancourt-Saint-Pierre (FR); Ralf Mayer, Bolanden (DE);
Bernd Ludewig, Weinheim (DE)

(73) Assignee: Johnson Controls Technology Company, Holland, MI (US)

( * ) Notice: Subject to any disclaimer, the term of this patent is extended or adjusted under 35 U.S.C. 154(b) by 319 days.

(21) Appl. No.: 14/130,262

(22) PCT Filed: Jun. 29, 2012

(86) PCT No.: PCT/EP2012/062685
§ 371 (c)(1),
(2), (4) Date: Mar. 27, 2014

(87) PCT Pub. No.: WO2013/004611
PCT Pub. Date: Jan. 10, 2013

(65) Prior Publication Data
US 2014/0225811 A1    Aug. 14, 2014

(30) Foreign Application Priority Data

Jul. 1, 2011   (DE) ........................ 10 2011 106 311
Feb. 6, 2012   (EP) .................................... 12154116

(51) Int. Cl.
*G02B 27/01*   (2006.01)
*G02B 7/182*   (2006.01)
*G03B 21/58*   (2014.01)
*B60R 1/00*    (2006.01)
*B60K 35/00*   (2006.01)

(52) U.S. Cl.
CPC ........... *G02B 27/0149* (2013.01); *B60K 35/00* (2013.01); *B60R 1/00* (2013.01); *G02B 7/1827* (2013.01); *B60K 2350/2052* (2013.01); *B60K 2350/941* (2013.01); *G02B 2027/015* (2013.01); *G02B 2027/0156* (2013.01); *G02B 2027/0159* (2013.01); *G02B 2027/0161* (2013.01); *G03B 21/58* (2013.01)

(58) Field of Classification Search
None
See application file for complete search history.

(56) References Cited

U.S. PATENT DOCUMENTS

| 4,635,033 | A |   | 1/1987 | Inukai et al. |
| 5,204,666 | A |   | 4/1993 | Aoki et al. |
| 5,386,216 | A | * | 1/1995 | Iino ........................ B60K 37/02 340/980 |
| 5,457,575 | A | * | 10/1995 | Groves .................. B60K 35/00 353/13 |

(Continued)

FOREIGN PATENT DOCUMENTS

| CN | 101346253 A | 1/2009 |
| CN | 201881992 U | 6/2011 |

(Continued)

OTHER PUBLICATIONS

Office Action dated Feb. 17, 2015, in corresponding Japanese application No. 2014-517730 and English translation, 4 pages.

(Continued)

*Primary Examiner* — Colby M Hansen
(74) *Attorney, Agent, or Firm* — Foley & Lardner LLP

(57) ABSTRACT

A head-up display has a screen, a cover for the screen, and a gear mechanism for simultaneously pivoting the screen and the cover around a pivot axis between a first end position and a second end position and concurrently shifting the cover relatively to the screen in such a way that the cover uncovers the screen in the first end position and completely covers the screen in the second end position.

8 Claims, 2 Drawing Sheets

(56) References Cited

U.S. PATENT DOCUMENTS

| | | | |
|---|---|---|---|
| 6,930,836 | B2 | 8/2005 | Harada et al. |
| 6,955,390 | B2 | 10/2005 | Rigorth et al. |
| 7,685,901 | B2* | 3/2010 | Leopold ............... B60R 11/02 296/24.34 |
| 2002/0089757 | A1 | 7/2002 | Bignolles et al. |
| 2005/0024490 | A1 | 2/2005 | Harada et al. |
| 2008/0285138 | A1* | 11/2008 | Lebreton ............... B60K 35/00 359/630 |
| 2010/0226086 | A1* | 9/2010 | Kissel ............... B60R 11/0235 361/679.21 |

FOREIGN PATENT DOCUMENTS

| | | |
|---|---|---|
| FR | 2 742 834 A1 | 6/1997 |
| JP | 60-203545 | 10/1985 |
| JP | 2005-062812 A | 3/2005 |
| JP | 2006-062501 A | 3/2006 |
| JP | 2007-182132 A | 7/2007 |
| JP | 2010-113197 A | 5/2010 |
| KR | 10-2008-0045849 A | 5/2008 |
| KR | 10-2010-0120375 | 11/2010 |

OTHER PUBLICATIONS

Office Action dated Nov. 28, 2014, in corresponding Korean application No. 10-2014-7002813, and English translation, 12 pages.
Office Action dated May 19, 2015, received in corresponding Chinese application No. 201280032964.3, and English translation 14 pages.
European Search Report mailed Dec. 11, 2012, as received in corresponding European Patent Application No. 12 15 4116.3.
International Search Report mailed Dec. 11, 2012, as received in corresponding International Patent Application No. PCT/EP2012/062685.
Office Action dated Feb. 4, 2016 in corresponding Chinese application No. 201280032964.3 and English translation, 15 pages.

\* cited by examiner

HEAD-UP DISPLAY FOR A VEHICLE

CROSS REFERENCE TO RELATED APPLICATIONS

The present application is a U.S. National Stage of International Application No. PCT/EP2012/062685, filed on Jun. 29, 2012, which claims the benefit of German Patent Application No. 10 2011 106 311.4, filed on Jul. 1, 2011, and European Patent Application No. 12154116.3, filed Feb. 6, 2012, the entire disclosures of all of which are incorporated herein by reference.

The invention relates to a head-up display and its use in a vehicle.

Head-up displays for vehicles are generally known in the state of the art. They comprise a display unit with a screen to display information, an imaging unit and possibly an optical module to project pictures onto the screen. The screen is transparent and arranged in the field of vision of a driver of the vehicle.

KR 1020080045849 A discloses a head-up display device for a vehicle comprising a head-up display optical system, a housing unit, and a sliding cover member. The head-up display optical system generates a virtual image in front of a driver and is installed in the housing unit. The sliding cover member includes a sliding cover, a cover gear portion, and a driving unit. The sliding cover is moved along a guide rail formed on the housing unit and opens/closes the housing unit. The driving unit provides operational power to the cover gear portion.

It is an object of the present invention to provide an improved head-up display with a pivotable screen to be used in a vehicle.

The object is achieved by a head-up display according to claim 1 and its use in a vehicle according to claim 10.

Preferred embodiments of the invention are given in the dependent claims.

According to the invention the object is solved by a head-up display comprising a screen, a cover for the screen and a gear mechanism for simultaneously pivoting the screen and the cover around a pivot axis between a first end position and a second end position and concurrently shifting the cover relatively to the screen in such a way that the cover uncovers the screen in the first end position and completely covers the screen in the second end position.

The invention makes it possible to expose the screen when it is needed to display information by pivoting the screen into a first position in which it is not covered by the cover. When the head-up display is not needed, it can be pivoted into a second position and covered by means of the cover. This has the advantage that the screen can be exposed only when the head-up display is to be used, and that it can be hidden and protected by means of the cover when it is not needed.

In a preferred embodiment of the invention the screen and the cover are pivoted between the first end position and the second end position by approximately 90 degrees.

This makes it possible to arrange the head-up display in such a way that the screen is upright in the first end position and that the screen is arranged horizontally in the second end position as it is advantageous for using the head-up display in a vehicle (see below).

Furthermore, preferably the screen and the cover are arranged substantially parallel to one another.

This provides a compact and space-saving arrangement of the cover relatively to the screen particularly in the second end position.

In a further preferred embodiment the gear mechanism is a planetary gearing comprising a sun gear coupled directly or indirectly to the screen and to the cover, a planet gear meshing with the sun gear, and a ring gear segment meshing with the plant gear.

A planetary gearing of this type provides advantageously an effective and compact gear mechanism for pivoting the screen and the cover.

In this embodiment the axis of the sun gear preferably defines the pivot axis.

This definition provides advantageously the simplest realization of the pivot axis, without further ado to define it.

Furthermore, in this embodiment a screen-sided surface of the cover comprises a coupling structure co-operating with the sun gear in such a way that a rotation of the sun gear causes a shift of the cover relatively to the screen.

Such a coupling structure provides a simple and effective way to cause pivoting of the screen and of the cover and shifting of the cover relatively to screen simultaneously my means of rotations of the sun gear.

Preferably this coupling structure is a corrugation meshing with the sun gear.

Such a corrugation provides a particularly simple and effective coupling of the cover to the sun gear in order to shift the cover relatively to the screen.

In a further preferred embodiment the gear mechanism is motor driven.

This allows advantageously to move the screen and the cover automatically.

Thereby the gear mechanism preferably is driven by a stepper motor.

The use of a stepper motor to drive the gear mechanism has the advantage that a stepper motor can be controlled precisely without any feedback mechanism concerning the motors position.

According to the invention a head-up display according to any one of the above mentioned embodiments is used in a vehicle having a vehicle dashboard equipped with a cavity for the head-up display. The head-up display is arranged in the cavity in such a way that in the first end position the screen is exposed in a field of vision of a driver of the vehicle and the cover is retracted into the cavity, and that in the second end position the screen is completely contained in the cavity and the cavity is shut at least partly by the cover.

In addition to the above-mentioned advantages of a head-up display according to the invention, in this way the head-up display is decently embedded in the vehicle dashboard. In particular, the cover of the screen is integrated into a surface of the vehicle dashboard when the head-up display is not needed. Furthermore, the cavity and the pivotable screen provide a space-saving arrangement of the head-up display in the vehicle dashboard.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

Corresponding parts are marked with the same reference symbols in all figures.

DETAILED DESCRIPTION OF PREFERRED EMBODIMENTS

Figure 1:
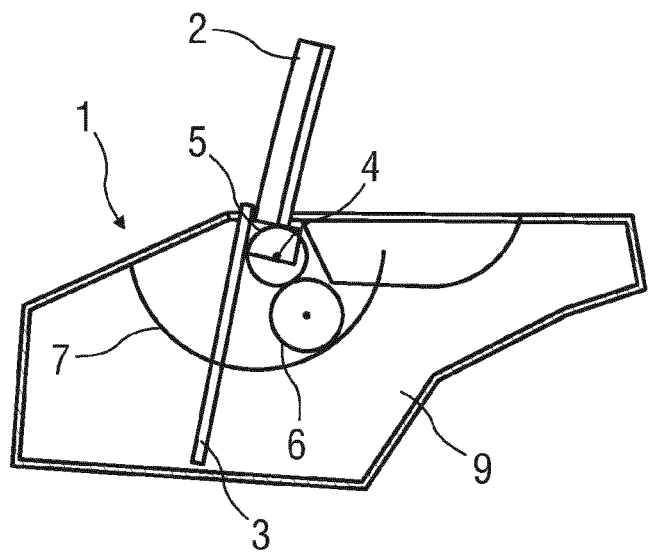
FIG. 1 shows a head-up display according to the invention with a screen and a cover in a first end position.

FIGS. 1 to 4 show sectional views of a head-up display 1 according to the invention comprising a screen 2 and a cover 3 for the screen 2 in various positions of the screen 2 and the cover 3, respectively.

The screen 2 and the cover 3 are arranged substantially parallel to one another and are simultaneously pivotable around a pivot axis 4 by almost 90 degrees between two end positions.

Figure 2:
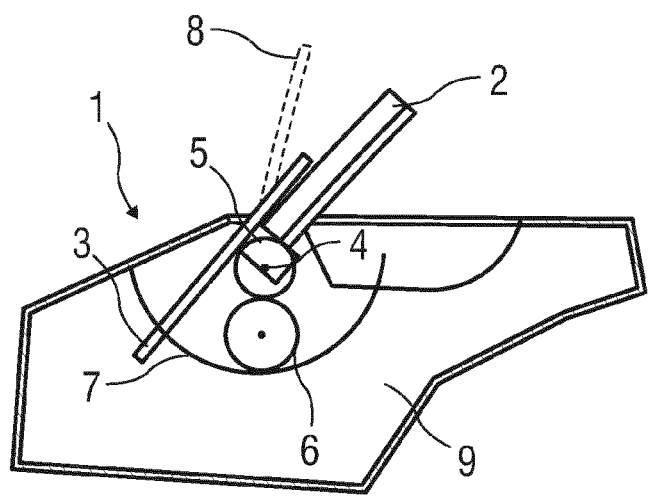
FIG. 2 shows the head-up display shown in FIG. 1 in a first intermediate position of the screen and the cover.
Figure 3:
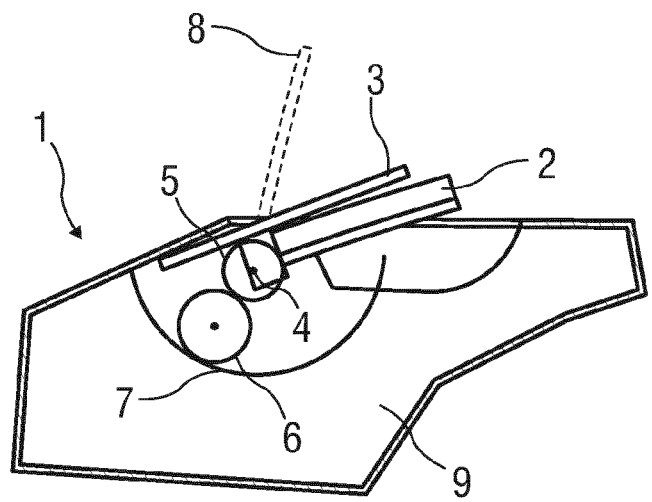
FIG. 3 shows the head-up display shown in FIGS. 1 and 2 in a second intermediate position of the screen and the cover.
Figure 4:
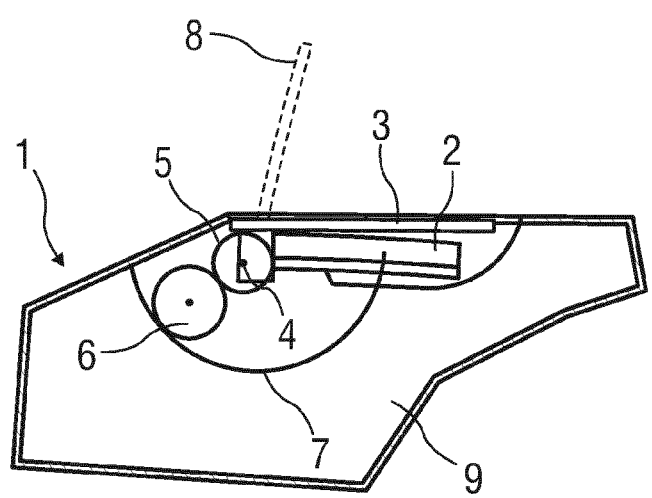
FIG. 4 shows the head-up display shown in FIGS. 1 to 3 in a second end position of the screen and the cover.

FIG. 1 shows the first end position of the screen 2 and the cover 3. FIG. 4 shows the second end position of the screen 2 and the cover 3. FIGS. 2 and 3 show two intermediate positions taken by the screen 2 and the cover 3 while being pivoted from the first end position into the second end position. FIGS. 2 to 4 also show the position 8 of the screen 2 in the first end position in order to illustrate the movement of the screen 2 more clearly.

In the first end position the screen 2 is upright and the cover 3 sits in parallel offset below the screen 2 without covering the screen 2. In the second end position the screen 2 and the cover 3 are arranged horizontally and the cover 3 completely covers the screen 2. While the screen 2 and the cover 3 are pivoted simultaneously from the first end position into the second end position, the cover 3 is shifted relatively to the screen 2 in such a way that it covers more and more the screen 2 until the screen 2 is covered completely by the cover 3 when the second end position is reached.

In order to simultaneously pivot the screen 2 and the cover 3 and concurrently shift the cover 3 relatively to the screen 2, the head-up display 1 is equipped with a planetary gearing comprising a sun gear 5 coupled to the screen 2 and the cover 3, a planet gear 6 meshing with the sun gear 5, and a ring gear segment 7 with inward-facing teeth meshing with the plant gear 6 and guiding the axis of the planet gear 6 along a segment of a circular curve. The axis of the sun gear 5 defines the pivot axis 4. The rotation of the sun gear 5 causes a pivoting of the screen 2 and of the cover 3 around the pivot axis 4.

The screen-sided surface of the cover 3 comprises a corrugation (not shown in detail in the figures) meshing with the sun gear 5 and co-operating with it in such a way that a rotation of the sun gear 5 causes the shifts of the cover 3 relatively to the screen 2.

The head-up display 1 further comprises a stepper motor (not shown in the figures) driving the planetary gearing via a drive shaft (not shown in the figures). The planetary gearing transfers the motor force to the screen 2 and the cover 3 to cause the simultaneous pivoting of the screen 2 and the cover 3 and the concurrent shifts of the cover 3 relatively to the screen 2.

The head-up display 1 is arranged in a cavity 9 of a vehicle dashboard of a vehicle. In the first end position the screen 2 is exposed in a field of vision of a driver of the vehicle and the cover 3 is retracted in the cavity 9. In the second end position the screen 2 is completely contained in the cavity 9 and the cavity 9 is shut by the cover 3.

LIST OF REFERENCES 1 head-up display
2 screen
3 cover
4 pivot axis
5 sun gear
6 planet gear
7 ring gear segment
8 position of the screen in the first end position
9 cavity

The invention claimed is:

1. A head-up display, comprising:
a screen;
a cover for the screen; and
a gear mechanism for simultaneously pivoting the screen and the cover around a pivot axis between a first end position and a second end position and concurrently shifting the cover relatively to the screen in such a way that the cover uncovers the screen in the first end position and completely covers the screen in the second end position;
wherein the gear mechanism is a planetary gearing comprising a sun gear coupled directly or indirectly to the screen and to the cover, a planet gear meshing with the sun gear, and a ring gear segment meshing with the planet gear; and
wherein a screen-sided surface of the cover comprises a coupling structure co-operating with the sun gear in such a way that a rotation of the sun gear causes the shift of the cover relatively to the screen.

2. A head-up display according to claim 1, wherein the screen and the cover are pivoted between the first end position and the second end position by approximately 90 degrees.

3. A head-up display according to claim 1, wherein the screen and the cover are arranged substantially parallel to one another.

4. A head-up display according to claim 1, wherein the axis of the sun gear defines the pivot axis.

5. A head-up display according to claim 1, wherein the coupling structure is a corrugation meshing with the sun gear.

6. A head-up display according to claim 1, wherein the gear mechanism is motor driven.

7. A head-up display according to claim 6, wherein the gear mechanism is driven by a stepper motor.

8. A vehicle comprising:
a vehicle dashboard; and
a head-up display according to claim 1,
wherein the vehicle dashboard is equipped with a cavity for the head-up display, and the head-up display is arranged in the cavity in such a way that in the first end position the screen is exposed in a field of vision of a driver of the vehicle and the cover is retracted into the cavity, and that in the second end position the screen is completely contained in the cavity and the cavity is shut at least partly by the cover.

* * * * *